June 2, 1959
V. P. FRIBERG
2,889,522
TUNED TRANSFORMER ASSEMBLY
Filed Aug. 5, 1953
2 Sheets-Sheet 1
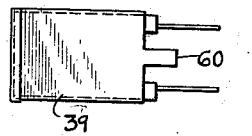
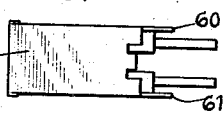
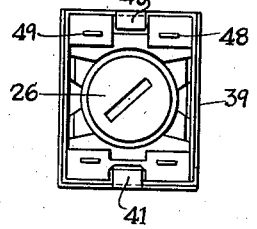
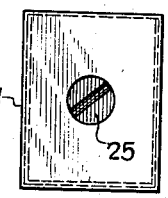
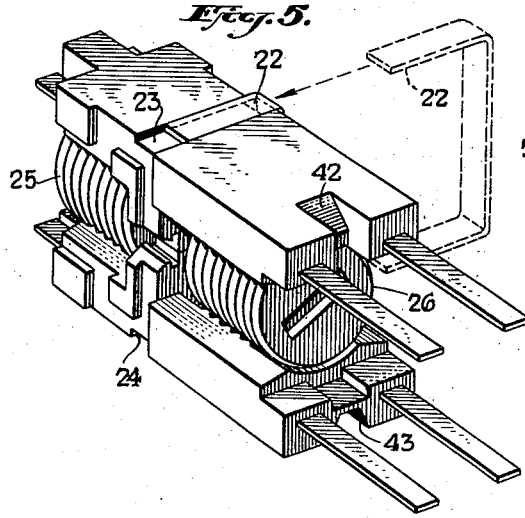
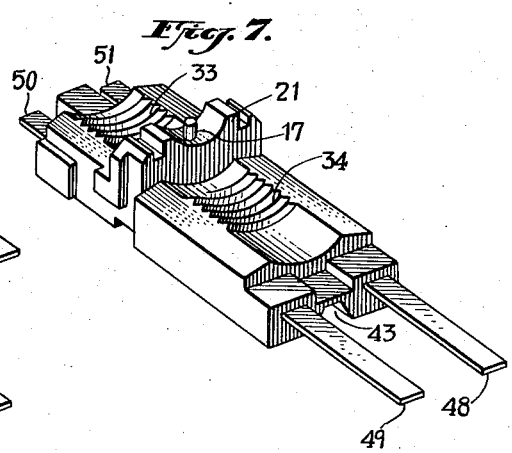
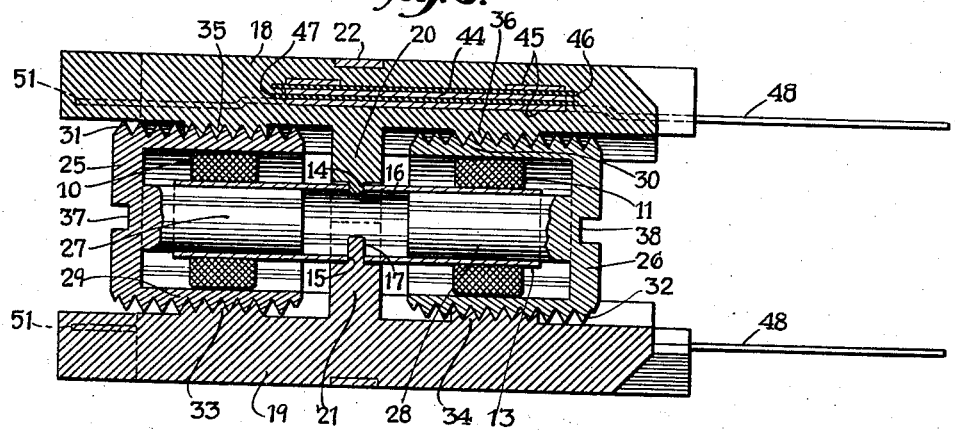
INVENTOR.
VINCENT P. FRIBERG.
BY Ward, Crosby & Neal
ATTORNEYS.

June 2, 1959
V. P. FRIBERG
2,889,522
TUNED TRANSFORMER ASSEMBLY
Filed Aug. 5, 1953
2 Sheets-Sheet 2
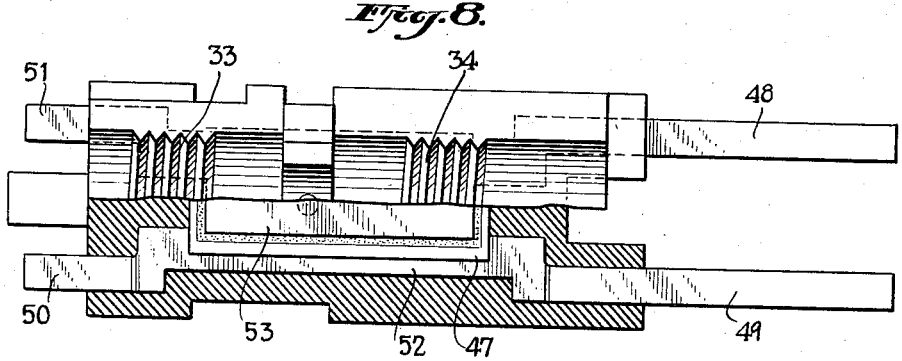
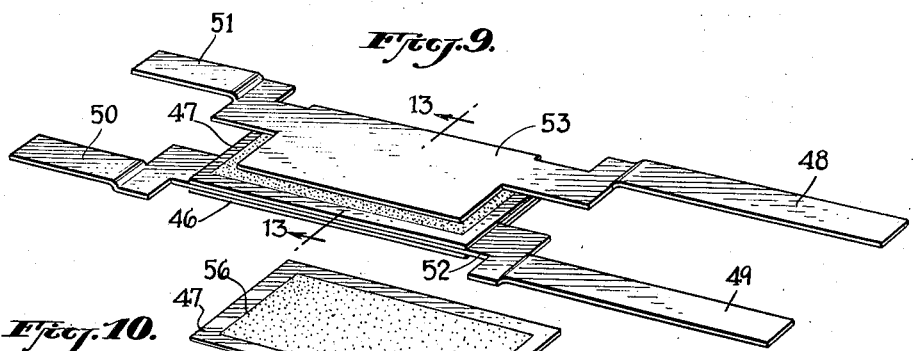
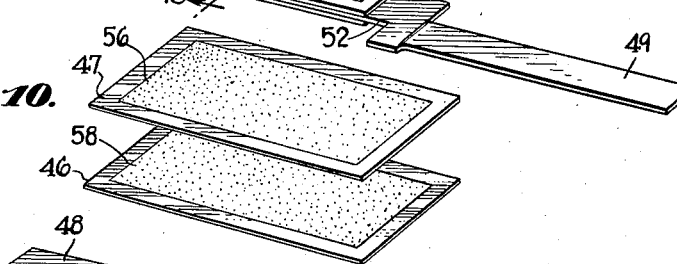
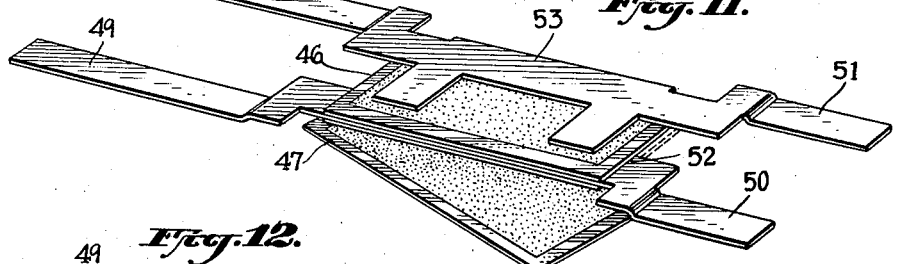
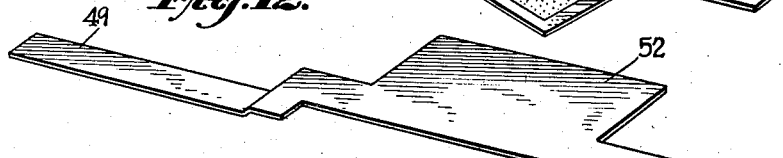
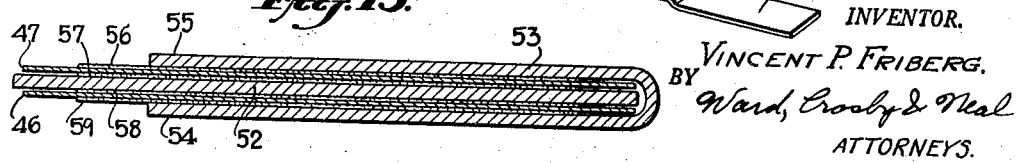
INVENTOR.
VINCENT P. FRIBERG.
BY Ward, Crosby & Neal
ATTORNEYS.

United States Patent Office 2,889,522
Patented June 2, 1959

2,889,522
TUNED TRANSFORMER ASSEMBLY

Vincent P. Friberg, Lyndhurst, N.J., assignor, by mesne assignments, to General Instrument Corporation, Newark, N.J., a corporation of New Jersey Application August 5, 1953, Serial No. 372,500

3 Claims. (Cl. 333—78)

This invention pertains to tuned, high frequency transformer assemblies and more particularly to transformers of this type which are especially adapted for use in the intermediate frequency portion of superheterodyne radio receivers and which are commonly referred to as I.F. transformers.

Intermediate frequency, or I.F., transformer assemblies, in general, comprise a pair of magnetically coupled coils, constituting primary and secondary transformer windings, and capacitors connected in shunt with the coils. The transformers may be tuned either by variation of the shunt capacitors or by magnetic cores associated with the coils or by a combination of both. If magnetic cores are employed to permit adjustment of the tuning of the transformer (inductance tuning), small, fixed capacitors are normally connected in shunt with the coils because they stabilize the transformer tuning.

To provide a close control over the frequency to which an I.F. transformer is tuned, the coils and their associated capacitors are generally assembled as a unit. Such an assembly is practically necessary for transformers designed to operate at very high radio frequencies at which lead lengths and the relative positions of the components have a substantial effect on the frequency to which the transformers tune.

It is desirable to reduce the size of an I.F. transformer assembly to a minimum, and it is generally desirable to reduce the cost of a transformer assembly such as by simplifying its assembly and by using inexpensive parts. The size can be reduced by reducing the size of the coils which in turn can be accomplished by the use of magnetic cores having a surrounding shell portion. The cores increase the inductance of a given size of coil, and the use of adjustable cores eliminates the need for further adjustable devices for tuning the transformer assembly.

As shown in Patent No. 2,435,630, the combined magnetic shell and core is provided with external threads and a pair of the combined core and shell members, as well as the form which supports the coils, are supported by a frame which has threaded portions cooperating with the threads on the magnetic members so as to permit adjustment of the magnetic members with respect to the coils. In order to keep the cross-sectional dimensions of the assembly in a plane transverse to the axis of the coil form to a minimum, the constructions shown in the aforesaid patent have mounted the fixed capacitors in line with the axis of the coil form and adjacent the end of the supporting frame. In order to permit sufficient movement of the magnetic member, there must be a relatively large spacing between the coils and the fixed capacitors, thus increasing the length of the assembly and the length of the leads extending between the coils and the capacitors and between the coils and the terminals at the end of the assembly.

In accordance with the arrangement of the present invention, the length of the assembly is reduced without any substantial change in cross-sectional dimension of the assembly in a plane transverse to the axis of the coil form and the length of the leads between the coils and the capacitors, as well as the length of the leads between the coils and the terminals extending externally of the assembly, are considerably reduced. This latter feature is of particular importance when the transformer assemblies are required to operate at very high radio frequencies.

In accomplishing the improved results of the invention, further advantages are also obtained. In accordance with the invention, the capacitors are embedded in a portion of the frame which supports the magnetic members and the coil form or, if two frame members are employed, a capacitor may be embedded in each frame member. The capacitor or capacitors replaces a portion of the material required for the frame member without weakening the frame member and, in fact, if suitable materials are employed in the construction of the capacitor the frame member is strengthened and made more rigid, thus improving the stability and ruggedness of the transformer assembly.

The present invention also relates to a novel capacitor construction which is particularly adapted for use in connection with a transformer assembly of the type described above. Such a capacitor has relatively few parts, is simple to assemble and requires no fasteners such as rivets, screws, etc. When the capacitor is embedded in the frame member, it is not only protected from external effects such as humidity, but also the parts of the capacitor are held rigidly in their desired relationship.

An object of my invention is to provide a tuned transformer assembly which is small in size, easy to assemble and economical to manufacture.

A further object of my invention is to provide a tuned transformer assembly which is physically rugged and stable and in which the lead lengths between the electrical components are relatively short.

Other objects and advantages of the invention will more fully appear from the following detailed description setting forth the manner in which I now prefer to practice the invention and from the accompanying drawings, in which:

Figs. 1 and 2 are views of the transformer assembly of my invention approximately to scale and taken from different sides of the assembly;

Figs. 3 and 4 are enlarged end views of the transformer assembly shown in Figs. 1 and 2;

Fig. 5 is an enlarged perspective view of the transformer assembly shown in the preceding figures with the container therefor removed and with the retaining clip for the assembly in its engaged and disengaged positions;

Fig. 6 is a side elevation, cross-sectional view of the assembly shown in Fig. 5;

Fig. 7 is a perspective view of one of the frame members shown in Fig. 5;

Fig. 8 is a plan view, partly in cross section of the frame member shown in Fig. 7;

Fig. 9 is a perspective view of the capacitor assembly forming part of the frame member shown in Figs. 7 and 8;

Fig. 10 is a perspective view of the coated sheets forming part of the capacitor assembly shown in Fig. 9;

Fig. 11 is a perspective view showing the reverse side of the capacitor assembly illustrated in Fig. 9 and showing one of the sheets of insulating material partly removed;

Fig. 12 is a perspective view of the intermediate plate of the capacitor assembly shown in Figs. 9 and 11; and Fig. 13 is a cross-sectional view of the capacitor assembly shown in Fig. 9 and taken along the line 13—13 indicated in Fig. 9.

Referring to Figs. 1–6, the transformer assembly of the invention includes a pair of magnetically-coupled coils 10 and 11 mounted on a coil form 13, the coils being annular in the embodiment shown and the coil form 13 being cylindrical. When the coils are so constructed and mounted, the magnetic axis of the coils is substantially the same as the axis of the cylindrical coil form 13. The coil form 13 has a pair of apertures 14 and 15 therein to receive projections 16 and 17 on frame members 18 and 19 so that the coil form 13 is held against longitudinal and rotational movement. The frame members 18 and 19 have inwardly projecting portions 20 and 21 which engage the outer surface of the coil form 13 and hence prevent lateral movement of the coil form 13. The frame members 18 and 19 are pressed against the coil form 13 by means of a resilient, U-shaped, retaining clip 22 which fits into slots or grooves 23 and 24 in the frame members.

The assembly is provided with a pair of magnetic members 25 and 26 which have central portions 27 and 28 joined at one end to tubular shell portions 29 and 30 surrounding and spaced at their inner surfaces from the central portions. The magnetic members 25 and 26 preferably are made of powdered iron admixed with a suitable thermo-setting resin and molded under heat and pressure to the desired configuration. The outer surfaces of the shell portions 29 and 30 are threaded as at 31 and 32, the frame members 18 and 19 each having a pair of threaded portions 33, 34, 35 and 36 which are pressed into engagement with the threads on the magnetic members 25 and 26 by means of the retaining clip 22. Preferably, the magnetic members each have an adjustment slot 37 and 38 so that by means of a screw driver or similar device the members 25 and 26 may be rotated and adjusted axially of the coil form 13 and hence the inductance of the coils 10 and 11 may be changed for tuning the assembly to the desired resonance frequency.

The assembly shown in Figs. 5 and 6 is enclosed within a container such as shield can 39, which preferably is made of metal and may be made of either magnetic or non-magnetic material, adequate magnetic shielding of the coils 10 and 11 being provided in many cases by the magnetic members 25 and 26. The shield can 39 has a pair of lugs 40 and 41 which are bent over and into the slots 42 and 43 in the frame members 18 and 19 so as to retain the assembly shown in Figs. 5 and 6 within the shield can 39.

The transformer assembly with the shield can 39 may be mounted on a surface such as the surface of a chassis and held in the desired position by a pair of lugs 60 and 61 which may be of the type shown or may be conventional threaded lugs secured to the shield can 39 and which extend through holes in the mounting surface.

Referring to Figs. 6–8, each of the frame members 18 and 19 has embedded therein a capacitor assembly including a pair of sheets or plates 45 and a sheet or plate 44 separated from each other by a pair of sheets 46 and 47 of insulating material such as mica. The plates 44 and 45 preferably have integrally therewith terminals 48 and 49 which extend from the end of the frame member. The terminals 48 and 49 may be made relatively large and rigid so that additional terminals are not required and so that they have a relatively low inductance. Although the leads from coil 11 may be connected to the terminals 48 and 49 extending from either frame member 18 or 19 and the leads from coil 10 may be connected to the terminals 48 and 49 extending from the other frame member, it is preferable that the plates 44 and 45 have terminals 50 and 51 extending from the end of the frame member opposite from the end from which the terminals 48 and 49 extend so that the leads from coil 10 may be connected to these terminals 50 and 51. In this manner the inductance of the leads from coil 10 to the terminals which extend externally of the shield can 39 is reduced, it being noted that in the assembly shown the terminals 48 and 49 extend externally of shield can 39.

The frame members 18 and 19 preferably are made of a plastic material such as a thermosetting or thermoplastic resin and the capacitor assembly is embedded therein during the molding process so that after the frame members are molded they completely enclose the body of the capacitor assembly and protect the capacitor assembly from the adverse effects of humidity, dust, etc. The frame member also holds the parts of the capacitor assembly rigidly in the desired relationship. With such an arrangement the strength and rigidity of the frame members 18 and 19 is greater than that of a similar frame member composed entirely of the plastic material, but the size of the frame members 18 and 19 is substantially the same as it would be if the capacitor assembly were not embedded therein.

The capacitor assembly is shown in greater detail in Figs. 9 and 10 and from these figures it will be seen that the capacitor assembly includes a first sheet of conductive material 44 having a pair of terminals 49 and 50 extending from opposite sides thereof, a pair of sheets of insulating material 46 and 47 mounted on opposite surfaces of the sheet 44 and a resilient U-shaped member 53 also made of conductive material such as metal and providing both of the plates 45. Terminals 48 and 51 extend from opposite sides of the member 53. The sheet 44 forms one plate of the capacitor and the sheet 44 as well as the sheets 46 and 47 are mounted within the arms 54 and 55 of the U-shaped member 53. The arms 54 and 55 press against the sheets 46, 47 and 50 and hold these sheets and the member in assembled relationship prior to being embedded in the frame members 18 and 19 without the use of rivets, screws, solder, etc.

In order to maintain the capacity of the capacitor assembly shown in the drawings within close tolerances and to eliminate the effect of variations in configuration and size of the sheet 44 and the member 53, the sheets of insulating material 46 and 47 may be provided on the opposite sides thereof with coatings 56—58 of a conductive material such as silver. With such a construction the arms 54 and 55 of member 53 make contact with the coatings 56 and 59 and the sheet 44 makes contact with the coatings 57 and 58. In this case the coatings 56—59 actually form the plates of the capacitor, but it is to be understood that the plates of the capacitor may be formed by the member 53 and the sheet 44 without the use of the coatings 56—59, the coatings 56—59 merely being an extension of the member 53 and the sheet 44.

It will be noted that the transformer assembly of the invention consists of relatively few parts and is held in assembled relationship without the use of screws, rivets, etc., so that it may be assembled in a relatively simple manner and without the use of a great amount of labor. Furthermore, the structure is small in size and rugged in construction and, therefore, provides improved electrical performance. Due to the elimination of a capacitor assembly extending transversely to the axis of the coil form, the magnetic members 25 and 26 are readily accessible and movable and the length of the transformer assembly is reduced.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent of the United States is:

1. A coil and capacitor assembly comprising a coil form, a pair of coils mounted on and enclosing said form and mounted in spaced relation to each other, a pair of magnetic members each having a shell portion, one of said members being mounted with its shell portion surrounding said one of said coils and the other of said members being correspondingly mounted with respect to the other end portion of said form and to said other of said coils, a pair of frame members having inner surfaces and mounted with their inner surfaces in frictional engagement with said cores and each of said frame members having a portion extending inwardly to said form and engaging the outer surface of said form, a pair of capacitors, one of said capacitors being embedded in and enclosed by one of said frame members and the other of said capacitors being embedded in and enclosed by the other of said frame members, each of said capacitors comprising a first sheet of substantially self-sustaining conductive material having an integral substantially self-sustaining terminal portion extending from an end thereof, a pair of sheets of insulating material mounted on opposite surfaces of said first sheet, and a substantially self-sustaining conductive member comprising a pair of leaves connected by a resilient reverse band active to urge said leaves toward one another, said first sheet of conductive material and said pair of sheets of insulating material being interposed between said leaves and pressed by said leaves against one another, said conductive member having an integral substantially self-sustaining terminal portion extending from an end thereof and spaced from the terminal portion forming part of said first conductive sheet, all of said terminal portions extending beyond the respective frame members, means electrically interconnecting said coils with said terminal portions, and a resilient clip engaging said frame members and pressing said frame members into engagement with said magnetic members and said form.

2. A coil and capacitor assembly comprising a coil form, a pair of coils mounted on and enclosing said form and mounted in spaced relation to each other, a pair of magnetic members each having a shell portion, one of said members being mounted with its shell portion surrounding said one of said coils and the other of said members being correspondingly mounted with respect to the other end portion of said form and to said other of said coils, a pair of frame members having inner surfaces and mounted with their inner surfaces in frictional engagement with said cores and each of said frame members having a portion extending inwardly to said form and engaging the outer surface of said form, a pair of capacitors, one of said capacitors being embedded in and enclosed by one of said frame members and the other of said capacitors being embedded in and enclosed by the other of said frame members, each of said capacitors comprising a first sheet of substantially self-sustaining conductive material having integral substantially self-sustaining terminal portions extending from each end thereof, a pair of sheets of insulating material mounted on opposite surfaces of said first sheet, and a substantially self-sustaining conductive member comprising a pair of leaves connected by a resilient reverse bend active to urge said leaves toward one another, said first sheet of conductive material and said pair of sheets of insulating material being interposed between said leaves and pressed by said leaves against one another, said conductive member having integral substantially self-sustaining terminal portions extending from each end thereof and spaced from the terminal portions forming part of said first conductive sheet, the terminal portions of said first sheet and said conductive member respectively extending beyond opposite ends of the respective frame members, means electrically interconnecting said coils with said terminal portions at one end of said frame members, said terminal portions at the other end of said frame members being effective for the electrical connection of external circuit elements to said assembly, and a resilient clip engaging said frame members and pressing said frame members into engagement with said magnetic members and said form.

3. In the assembly of claim 2, a container in which said assembly is received, said terminal portions at said other end of said frame members extending out beyond said container, said terminal portions at said one end of said frame members and said means electrically connecting said coils therewith being received within said container.

References Cited in the file of this patent

UNITED STATES PATENTS

| | | |
|---|---|---|
| 1,181,623 | Van Deventer | May 2, 1916 |
| 1,526,664 | Dubilier | Feb. 17, 1925 |
| 2,105,296 | Pearson et al. | Jan. 11, 1938 |
| 2,143,369 | Dubilier | Jan. 10, 1939 |
| 2,166,205 | Anderson et al. | July 18, 1939 |
| 2,279,826 | Kater | Apr. 14, 1942 |
| 2,336,091 | Gray | Dec. 7, 1943 |
| 2,369,177 | Raskhodoff | Feb. 13, 1945 |
| 2,435,630 | Ketcham | Feb. 10, 1948 |
| 2,452,560 | Gainer | Nov. 2, 1948 |
| 2,470,826 | McMahon | May 24, 1949 |
| 2,544,508 | Mackey | Mar. 6, 1951 |
| 2,552,999 | Pannell et al. | May 15, 1951 |
| 2,626,318 | Torre | Jan. 20, 1953 |
| 2,628,271 | Brafman | Feb. 10, 1953 |

UNITED STATES PATENT OFFICE
CERTIFICATE OF CORRECTION

Patent No. 2,889,522

June 2, 1959

Vincent P. Friberg

It is hereby certified that error appears in the printed specification of the above numbered patent requiring correction and that the said Letters Patent should read as corrected below.

Column 5, line 16, for "band" read -- bend --.

Signed and sealed this 14th day of June 1960.

(SEAL)
Attest:

KARL H. AXLINE
Attesting Officer

ROBERT C. WATSON
Commissioner of Patents